US009886370B2

(12) United States Patent
Doss (10) Patent No.: US 9,886,370 B2
(45) Date of Patent: Feb. 6, 2018

(54) METHOD AND SYSTEM FOR GENERATING A TEST SUITE

(71) Applicant: Wipro Limited, Bangalore (IN)

(72) Inventor: Sathya Keerthi Mohan Doss, Bentonville, AR (US)

(73) Assignee: WIPRO LIMITED, Bangalore (IN)

( * ) Notice: Subject to any disclaimer, the term of this patent is extended or adjusted under 35 U.S.C. 154(b) by 87 days.

(21) Appl. No.: 14/945,852

(22) Filed: Nov. 19, 2015

(65) Prior Publication Data
US 2017/0147481 A1 May 25, 2017

(51) Int. Cl.
*G06F 11/00* (2006.01)
*G06F 11/36* (2006.01)

(52) U.S. Cl.
CPC ...... *G06F 11/3684* (2013.01); *G06F 11/3664* (2013.01); *G06F 11/3672* (2013.01); *G06F 11/3676* (2013.01); *G06F 11/3688* (2013.01); *G06F 11/3692* (2013.01)

(58) Field of Classification Search
CPC ............. G06F 11/3688; G06F 11/3684; G06F 11/3664; G06F 11/3672; G06F 11/3692; G06F 11/3676
See application file for complete search history.

(56) References Cited

U.S. PATENT DOCUMENTS

| 6,182,245 | B1 * | 1/2001 | Akin | G06F 11/3672 711/100 |
| 8,266,593 | B2 | 9/2012 | Narayanan et al. | |
| 8,595,691 | B2 | 11/2013 | Ellen et al. | |
| 8,601,446 | B2 | 12/2013 | Narayanan et al. | |
| 2003/0093716 | A1 * | 5/2003 | Farchi | G06F 11/3676 714/34 |
| 2006/0075305 | A1 * | 4/2006 | Robinson | G06F 11/3684 714/38.1 |
| 2011/0231708 | A1 * | 9/2011 | Lawrance | G06F 11/3684 714/38.1 |
| 2012/0192153 | A1 * | 7/2012 | Venkatraman | G06F 11/3672 717/124 |
| 2015/0309918 | A1 * | 10/2015 | Raghavan | G06F 11/3688 714/38.1 |
| 2016/0085663 | A1 * | 3/2016 | Best | G06F 11/3692 714/38.1 |

* cited by examiner

*Primary Examiner* — Charles Ehne
(74) *Attorney, Agent, or Firm* — Finnegan, Henderson, Farabow, Garrett & Dunner LLP (57) ABSTRACT

The present disclosure relates to a method and a system for generating a test suite comprising test cases. In one embodiment, the method generates the test cases based on functional requirements, service requirements and performance requirements received from a user such as a quality engineer associated with a software product or application. The method analyzes the interdependencies among the received requirements, generates sequences of the requirements based on the interdependencies and generates intermediate test cases based on the sequences. Further, the method deploys a test modeling tool on the intermediate test cases to generate final test cases which are then tested to evaluate the performance of the software product or the application. The test suite comprising the final test cases thus generated is rigid and provides a new dimension to the quality engineer to avoid the production failures and defect slippages and sustain the quality assurance (QA) of the business.

15 Claims, 4 Drawing Sheets

METHOD AND SYSTEM FOR GENERATING A TEST SUITE

FIELD OF THE DISCLOSURE

The present subject matter is related, in general to testing system, and more particularly, but not exclusively to method and a system for generating a test suite used in evaluating the performance of a software product.

BACKGROUND

Generally, to build any software product or application, needs of its users are captured as requirements and defined in a requirements specification. In particular, requirements include functional, business and technical requirements which are gathered to generate test cases used for testing the software product or application for compliance with the users' needs. Testing has always been a crucial part in development of any software product. Typically, agile software development methodologies involve rapid software development with shorter development lifecycle and greater collaboration between various stakeholders. The shorter development life cycle is ensured by developing an application in various logical and coherent units of functionalities, also referred to as iterations and testing the iterations in less time.

Conventionally, test cases drafted from the functional perspective helps to achieve the business goals however the underlying data validations, related web services, performance parameters and product regression is a challenge to achieve them through a single medium due to various impediments. Therefore, collaborative test case coverage is becoming a major challenge in the current industry due to agile methods and quick to market targets. Further, defects in service layers and performance affects business largely and in turn the cost of rework of the product/feature. In addition, poor response times and services not responding appropriately due to lack of test case coverages and time constraints also affect the business to a large extent.

Although, various collaboration tools exist, such tools fail to effectively and efficiently capture the user requirements and generate the test cases.

SUMMARY OF THE DISCLOSURE

The present disclosure relates to capturing user requirements including functional, services and performance (FSP) requirements and generating a test suite comprising collaborative test cases based on all FSP requirements. The test suite thus generated is rigid and provides a new dimension to the quality engineer to avoid the production failures and defect slippages and sustain the quality assurance (QA) of the business.

Accordingly, the present disclosure relates to a method of generating a test suite comprising a plurality of test cases. The method comprising the step of receiving a plurality of first requirements, wherein each of the plurality of first requirements comprise functional requirements, service requirements, and performance requirements associated with a software application. The method further comprising identifying one or more interdependencies among the functional requirements, the service requirements, and the performance requirements and generating an interdependency matrix based on one or more interdependencies. Based on the interdependency matrix, one or more execution sequences of the plurality of first requirements are determined. Using the one or more execution sequences of the plurality of first requirements, the test suite comprising the plurality of test cases is generated.

Further, the present disclosure relates to a system for generating a test suite comprising a plurality of test cases. The system comprises a processor and a test case repository coupled with the processor. The test case repository stores one or more historical test cases and the execution outputs associated with execution of the one or more historical test cases. The system further comprises a memory communicatively coupled with the processor, wherein the memory stores processor-executable instructions, which, on execution, cause the processor to receive a plurality of first requirements, wherein each of the plurality of first requirements comprise functional requirements, service requirements, and performance requirements associated with a software application. The processor is further configured to identify one or more interdependencies among the functional requirements, the service requirements, and the performance requirements. Upon identifying the one or more interdependencies, the processor is configured to generate an interdependency matrix based on one or more interdependencies. The processor is further configured to determine one or more execution sequences of the plurality of first requirements based on the interdependency matrix and generate the test suite comprising the plurality of test cases based on the one or more execution sequences of the plurality of first requirements.

Furthermore, the present disclosure relates to a non-transitory computer readable medium including instructions stored thereon that when processed by at least one processor cause a system to perform the act of receiving a plurality of first requirements, wherein each of the plurality of first requirements comprise functional requirements, service requirements, and performance requirements associated with a software application. Further, the instructions cause the processor to identify one or more interdependencies among the functional requirements, the service requirements, and the performance requirements and generate an interdependency matrix based on one or more interdependencies. The processor is also configured to determine one or more execution sequences of the plurality of first requirements based on the interdependency matrix and generate the test suite comprising the plurality of test cases based on the one or more execution sequences of the plurality of first requirements.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a method and a system for generating a test suite comprising test cases. In one embodiment, the method generates the test cases based on functional requirements, service requirements and performance requirements received from a user, for example a quality engineer associated with a software product or application. The method analyses the interdependencies among the received requirements, generates sequences of the requirements based on the interdependencies and generates intermediate test cases based on the sequences. Further, the method deploys a test modeling tool on the intermediate test cases to generate final test cases which are then tested to evaluate the performance of the software product or the application. The test suite comprising the final test cases thus generated is rigid and provides a new dimension to the quality engineer to avoid the production failures and defect slippages and sustain the quality assurance (QA) of the business.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
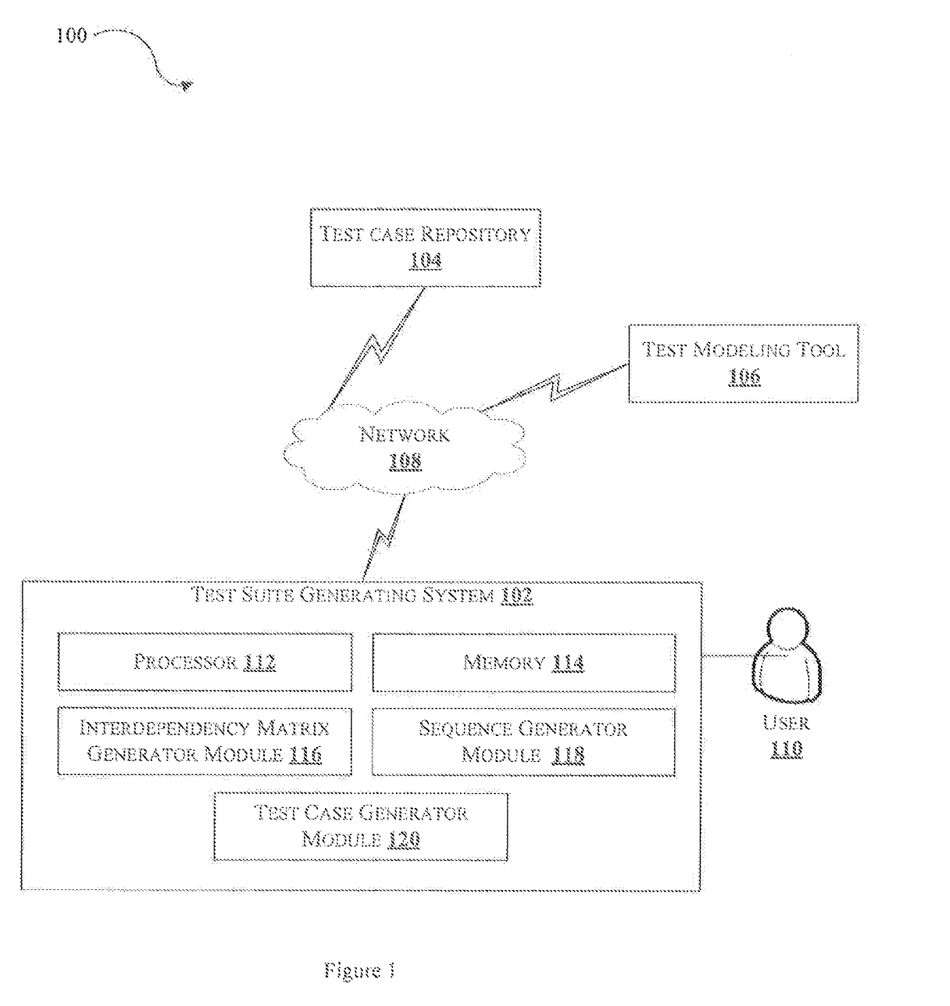
FIG. 1 illustrates an architecture diagram of an exemplary system for generating a test suite in accordance with some embodiments of the present disclosure.

FIG. 1 illustrates an architecture diagram of an exemplary system for generating a test suite in accordance with some embodiments of the present disclosure.

As shown in FIG. 1, the exemplary system 100 comprises one or more components configured for generating a test suite comprising a plurality of test cases used in evaluating the performance of a software product or application. In one embodiment, the exemplary system 100 comprises a test suite generating system (TSGS) 102, a test case repository 104 and a test modeling tool 106 connected via a communication network 108.

The communication network 108 (alternatively referred to as network 108) may be a wireless network, a wired network, or a combination thereof. The network 108 can also be an individual network or a collection of many such individual networks, interconnected with each other and 108 as a single large network, for example, the Internet or an intranet. The network 108 can be implemented as one of the different types of networks, such as intranet, local area network (LAN), wide area network (WAN), the Internet, and such. Further, the network 108 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other.

The test case repository 104, in one embodiment, may be integrated within the TSGS 102. In another embodiment, the test case repository 104 may be implemented independent of the TSGS 102. The test case repository 104 may be for example, a data warehouse configured to store metadata related to test cases and corresponding execution outputs that are previously determined and stored. The test cases stored in the test case repository 104 are historical data recorded in the past by the user 110. The user 110 may be, for example a Quality Assurance Engineer or a Quality Analyst associated with the software product or application. The test case repository 104 may also be configured to store a plurality of requirements related with the stored test cases and corresponding execution outputs. In addition, the test case repository 104 may also store business processes, rules, policies, partial data models, use cases, user stories, features, tasks, product backlog, sprints and prototype plans. The TSGS 102 and the test modeling tool 106 interact with the test case repository 104 to retrieve and update the stored data.

In one embodiment, the TSGS 102 comprises a central processing unit ("CPU" or "processor") 112, and a memory 114 coupled with the processor 112. The TSGS 102 further comprises an interdependency matrix generator module (alternatively referred to as matrix module) 116, a sequence generator module 118 and a test case generator module 120 coupled with the processor 112 and the memory 114.

Figure 2:
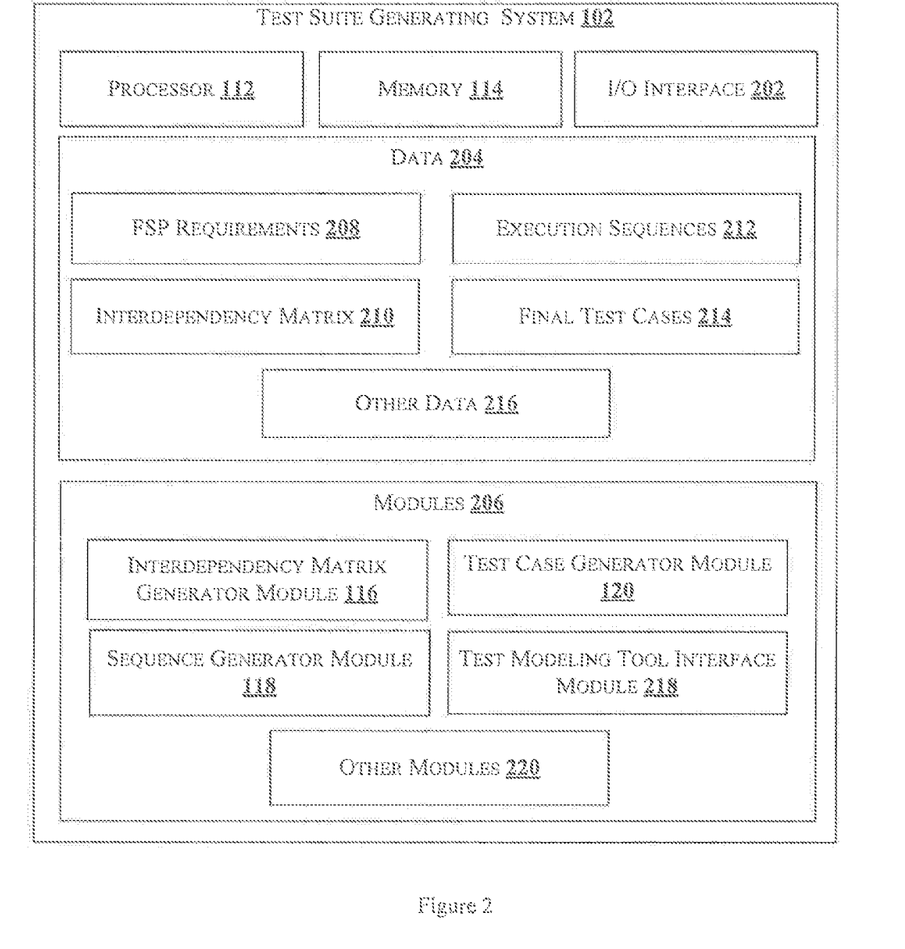
FIG. 2 illustrates an exemplary block diagram of a test suite generating system in accordance with some embodiments of the present disclosure.

The TSGS 102 may be a typical test suite generating system as illustrated in FIG. 2. The TSGS 102 comprises the processor 112, the memory 114 and an I/O interface 202. The I/O interface 202 is coupled with the processor 112 and an I/O device. The I/O device is configured to receive inputs via the I/O interface 202 and transmit outputs for displaying in the I/O device via the I/O interface 202. The TSGS 102 further comprises data 204 and modules 206. In one implementation, the data 204 and the modules 206 may be stored within the memory 114. In one example, the data 204 may include Functional-Service-Performance (FSP) requirements 208, interdependency matrix 210, one or more execution sequences 212, a plurality of final test cases 214 and other data 216. In one embodiment, the data 204 may be stored in the memory 114 in the form of various data structures. Additionally, the aforementioned data can be organized using data models, such as relational or hierarchical data models. The other data 216 may be also referred to as reference repository for storing recommended implementation approaches as reference data. The other data 216 may also store data, including temporary data and temporary files, generated by the modules 206 for performing the various functions of the TSGS 102.

The modules 206 may include, for example, the matrix module 116, the sequence generator module 118, the test case generator module 120 and a test modeling tool interface module 218. The modules 206 may also comprise other modules 220 to perform various miscellaneous functionalities of the TSGS 102. It will be appreciated that such aforementioned modules may be represented as a single module or a combination of different modules. The modules 206 may be implemented in the form of software, hardware and/or firmware.

In operation, the TSGS 102 generates a plurality of test cases corresponding to a plurality of requirements associated with a software application. In one embodiment, the TSGS 102 receives the plurality of FSP requirements from the user 110 for generating a plurality of test cases corresponding to the plurality of requirements 208. The plurality of FSP requirements 208 (interchangeably referred to as plurality of first requirements 208) include functional requirements, service requirements and performance requirements associated with the software application or software product. In an online checkout process as an example of a software application where an in-customer places an online order for an item or a transaction and completes the transaction, the functional requirements may include requirements associated with placing of the order and completing the transaction, the service requirements may include service level methods and algorithms like pricing and inventory system calculations and the performance requirements may include requirements associated with response time, peak load time etc., associated with payment processing and completion of payment transaction.

In one implementation, the plurality of first requirements 208 such as R1, R2, R3, R4 and R5 may be represented as a flow diagram, for example. The flow diagram represents the plurality of requirements as nodes and interdependencies among the plurality of requirements in the form of directed edges between the nodes. The TSGS 102 generates an interdependency matrix 210 corresponding to the plurality of first requirements 208 thus received.

In one embodiment, the matrix module 116 generates the interdependency matrix 210 corresponding to the plurality of first requirements 208. In one example, the matrix module 116 identifies one or more interdependencies among the plurality of first requirements 208 and generates a dependency structure matrix (DSM) indicating dependencies among the plurality of first requirements 208 associated with the software application or product.

Table 1 below illustrates an exemplary DSM matrix of the plurality of first requirements 208 (example R1, R2, . . . R5).

TABLE 1

| Requirements Numbers R(n) | R1 | R2 | R3 | R4 | R5 |
|---|---|---|---|---|---|
| R1 |  | 1 |  | 1 |  |
| R2 |  |  |  | 1 |  |
| R3 |  |  |  |  |  |
| R4 |  |  |  |  | 1 |
| R5 |  |  |  |  |  |

As illustrated above in Table 1, R1 and R2 are interdependent, hence represented by an indicator like '1' to show the dependency between the requirements. Accordingly the DSM matrix entry corresponding to R1 (row) and R2 (column) is indicated by '1'. Upon generating the interdependency matrix 210, the MOS 102 determines one or more execution sequences 212 based on the interdependency matrix 210.

In one embodiment, the sequence generator module 118 determines the one or more execution sequences 212 that define the order in which the plurality of first requirements 208 are executed. The sequence generator module 118 determines one or more second requirements amongst the plurality of first requirements 208 having similar interdependencies based on the interdependency matrix 210 and creates at least one group of the one or more second requirements upon identification. In one implementation, the sequence generator module 118 determines as to whether grouping of the plurality of first requirements 208 is required. If it is determined that the plurality of first requirements 208 have the same interdependency level, then the sequence generator module 118 skips the creation of the at least one group. If it is determined that the plurality of first requirements 208 do not have same interdependency level, then sequence generator module 118 creates at least one group of the one or more second requirements having similar interdependency level upon identification.

The sequence generator module 118 further assigns a sequence number to each of the at least one group thereby generating the one or more execution sequences 212 of the plurality of first requirements 208. Each of the one or more execution sequences 212 is unique and is represented by Sn, where 'n' represent the sequence number. In one example, the sequence generator module 118 assigns a lower order sequence number to a group amongst the at least one group if the one or more second requirements in the group are not dependent on execution of one or more second requirements present in the other groups. The sequence generator module 118 also assigns a higher order sequence number to a group amongst the at least one group if the one or more second requirements in the group are dependent on execution of one or more second requirements present in the other groups.

TABLE 2

| Sequence (Sn) | Requirements Number R(n) |
|---|---|
| S1 | R3, R5 |
| S2 | R4 |
| S3 | R1 |
| S4 | R2 |

As illustrated in Table 2, the plurality of first requirements 208 for example, R3 and R5 identified as having similar interdependency level are grouped together and assigned with sequence number S1, requirements R3 and R5 of the execution sequence S1 has no dependency on other remaining requirements i.e. R1, R2 and R4. In another example, the requirement R2 in the execution sequence S4 is dependent and cannot be achieved unless all the other requirements R1, R4, and R5 are achieved. Further, as illustrated above, sequence S1 is numbered with the higher order sequence number '1' and sequence S4 is numbered with lower order sequence number '4'.

Upon determining the one or more execution sequences 212, the TSGS 102 generates the test suite comprising the plurality of test cases corresponding to the plurality of first requirements 208 based on the one or more execution sequences 212.

In one implementation, the test case generator module 120 determines the plurality of test cases 214 based on the one or more execution sequences 212. The test case generator module 120 determines a plurality of intermediate test cases using any known testing technique. In one example, the test case generator module 120 determines the plurality of intermediate test cases using Orthogonal Array Testing (OAT) technique or tool on the one or more execution sequences 212 thus determined. The OAT technique creates an orthogonal array comprising all possible combinations of the requirements in the one or more execution sequences 212 based on the corresponding interdependencies. The OAT array comprises a number of rows, each row representing an intermediate test case i.e, one possible combination of requirements. The test generator module 120 thus generates the plurality of intermediate test cases as depicted below in the Table 3.

TABLE 3

| Test Case # | S1 | S2 | S3 | S4 |
|---|---|---|---|---|
| 1 | R3 | R4 | R1 | R2 |
| 2 | R5 | R4 | R1 | R2 |

Upon determining the plurality of intermediate test cases, the test case generator module 120 generates the test suite comprising the plurality of final test cases 214 used for testing the software application or product.

In one embodiment, the test case generator module 120 generates the test suite using the test modeling tool 106. The test case generator module 120 is configured to interact with the test modeling tool 106 via the test modeling tool interface module 218 (interchangeably referred to as interface module 218). The interface module 218 feeds the plurality of intermediate test cases into the test modeling tool 106. The test modeling tool 106 identifies the plurality of test cases 214 having optimized execution outputs, in one embodiment, the test modeling tool 106 performs mapping of the plurality of intermediate test cases with a plurality of predefined test cases obtained from the test case repository 104. Based on the mapping, the test modeling tool 106 identifies the plurality of mapped test cases with optimized execution outputs. The test case generator module 120 receives the plurality of mapped test cases via the interface module 218 from the test modeling tool 106 and generates the test suite comprising the plurality of final test cases 214 suitable for testing the software application or product. The test case generator module 120 also updates the test case repository 104 with the generated test suite comprising the plurality of final test cases 214 along with the corresponding execution outputs.

Thus, the system 100 enables generation of the test suite comprising the final test cases 214 that is rigid and provides a new dimension to the quality engineer to avoid the production failures and defect slippages and sustain the quality assurance (QA) of the business.

Figure 3:
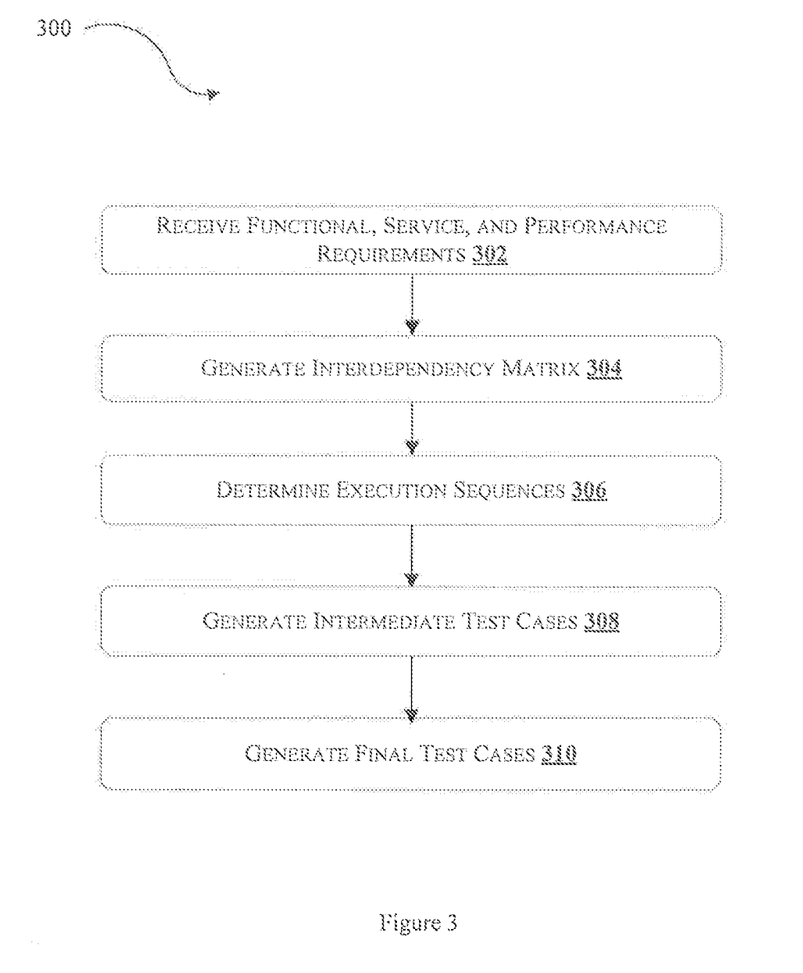
FIG. 3 illustrates a flowchart of an exemplary method of generating a test suite in accordance with some embodiments of the present disclosure.

FIG. 3 illustrates a flowchart of a method of generating a test suite comprising a plurality of test cases in accordance with some embodiments of the present disclosure.

As illustrated in FIG. 3, the method 300 comprises one or more blocks implemented by the processor 112 for generating a test suite comprising a plurality of test cases used for evaluating the performance of a software application or product. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method 300. Additionally, individual blocks may be deleted from the method 300 without departing from the spirit and scope of the subject matter described herein. Furthermore, the method 300 can be implemented in any suitable hardware, software, firmware, or combination thereof.

At block 302, receive functional, services and performance (FSP) requirements. In one embodiment, the TSGS 102 receives the plurality of FSP requirements 208 from the user 110 for generating a plurality of test cases corresponding to the plurality of requirements 208. The plurality of FSP requirements 208 (interchangeably referred to as plurality of first requirements 208) include functional requirements, service requirements and performance requirements associated with the software application or software product. Upon receiving the FSP requirements 208, the TSGS 102 generates an interdependency matrix 210 corresponding to the plurality of first requirements 208 thus received.

At block 304, generate interdependency matrix. In one embodiment, the matrix module 116 generates the interdependency matrix 210 corresponding to the plurality of first requirements 208. In one example, the matrix module 116 identifies one or more interdependencies among the plurality of first requirements 208 and generates a dependency structure matrix (DSM) indicating dependencies associated with the software application or product based on the plurality of first requirements 208.

At block 306, determine execution sequences. In one embodiment, the sequence generator module 118 determines the one or more execution sequences 212 that define the order in which the plurality of first requirements 208 are executed. The sequence generator module 118 determines one or more second requirements amongst the plurality of first requirements 208 having similar interdependencies based on the interdependency matrix 210 and creates at least one group of the one or more second requirements upon identification. In one implementation, the sequence generator module 118 determines as to whether grouping of the plurality of first requirements 208 is required. If it is determined that the plurality of first requirements 208 have the same interdependency level, then the sequence generator module 118 skips the creation of the at least one group. If it is determined that the plurality of first requirements 208 do not have same interdependency level, then sequence generator module 118 creates at least one group of the one or more second requirements having similar interdependency level upon identification.

The sequence generator module 118 further assigns a sequence number to each of the at least one group thereby generating the one or more execution sequences 212 of the plurality of first requirements 208. Each of the one or more execution sequences 212 is unique and is represented by Sn, where 'n' represent the sequence number. In one example, the sequence generator module 118 assigns a lower order sequence number to a group amongst the at least one group if the one or more second requirements in the group are not dependent on execution of one or more second requirements present in the other groups. The sequence generator module 118 also assigns a higher order sequence number to a group amongst the at least one group if the one or more second requirements in the group are dependent on execution of one or more second requirements present in the other groups. Upon determining the one or more execution sequences 212, the TSGS 102 generates the test suite comprising the plurality of test cases corresponding to the plurality of first requirements 208 based on the one or more execution sequences 212.

At block 308, generate intermediate test cases. In one embodiment, the test case generator module 120 determines the plurality of test cases 214 based on the one or more execution sequences 212. The test case generator module 120 determines a plurality of intermediate test cases using any known testing technique. In one example, the test case generator module 120 determines the plurality of intermediate test cases using Orthogonal Array Testing (OAT) technique or tool on the one or more execution sequences 212 thus determined. The OAT technique creates an orthogonal array comprising au possible combinations of the requirements in the one or more execution sequences 212 based on the corresponding interdependencies. The OAT array comprises a number of rows, each row representing an intermediate test case i.e. one possible combination of requirements.

Upon determining the plurality of intermediate test cases, the test case generator module 120 generates the suite comprising the plurality of final test cases 214 used for testing the software application or product.

At block 310, generate final test cases. In one embodiment, the test case generator module 120 generates the test suite using the test modeling tool 106. The test case generator module 120 is configured to interact with the test modeling tool 106 via the test modeling tool interface module 218 (interchangeably referred to as interface module 218). The interface module 218 feeds the plurality of intermediate test cases into the test modeling tool 106. The test modeling tool 106 identifies the plurality of test cases 214 having optimized execution outputs. In one embodiment, the test modeling tool 106 performs mapping of the plurality of intermediate test cases with a plurality of predefined test cases obtained from the test case repository 104. Based on the mapping, the test modeling tool 106 identifies the plurality of mapped test cases with optimized execution outputs. The test case generator module 120 receives the plurality of mapped test cases via the interface module 218 from the test modeling tool 106 and generates the test suite comprising the plurality of final test cases 214 suitable for testing the software application or product. The test case generator module 120 also updates the test case repository 104 with the generated test suite comprising the plurality of final test cases 214 along with the corresponding execution outputs.

Thus, the system 100 enables generation of the test suite comprising the final test cases 214 that is rigid and provides a new dimension to the quality engineer to avoid the production failures and defect slippages and sustain the quality assurance (QA) of the business.

Figure 4:
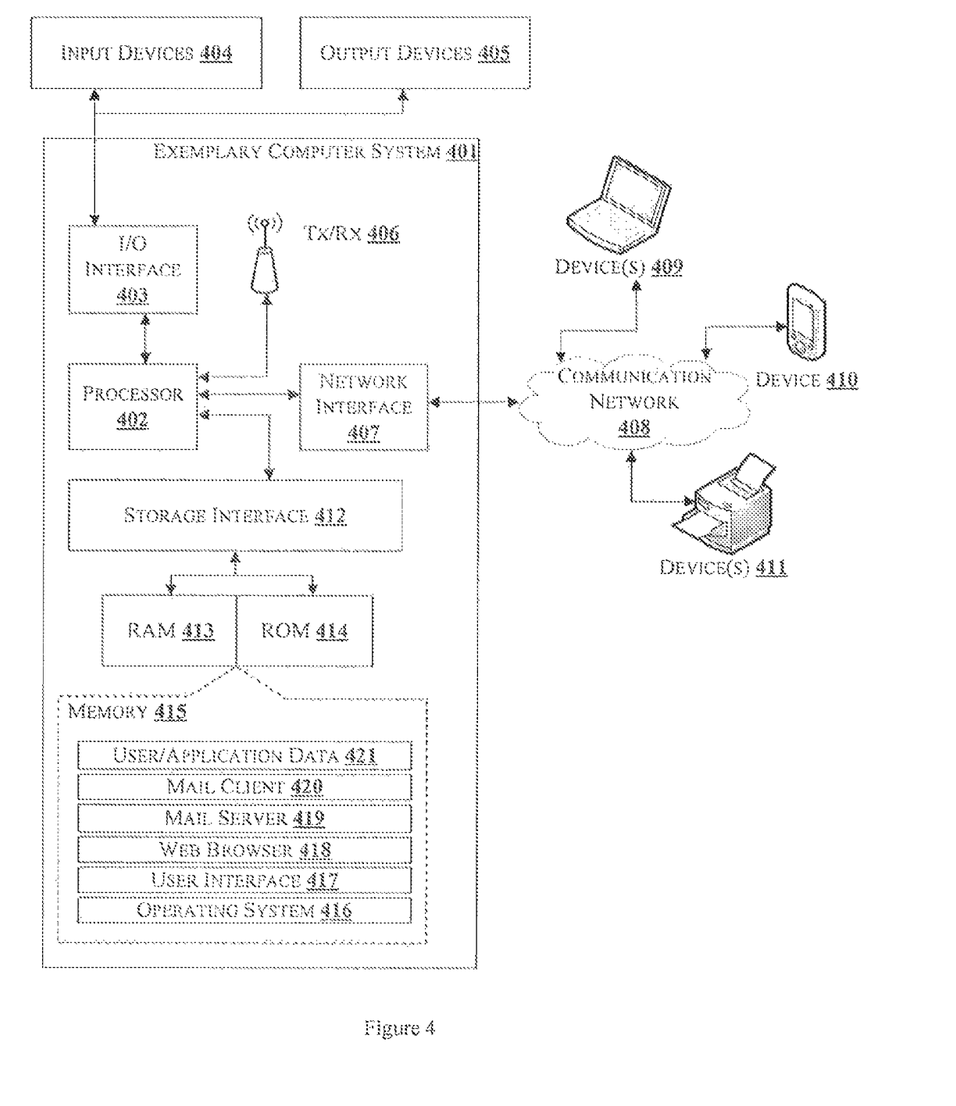
FIG. 4 is a block diagram of an exemplary computer system for implementing embodiments consistent with the present disclosure.

FIG. 4 is a block diagram of an exemplary computer system for implementing embodiments consistent with the present disclosure.

Variations of computer system 401 may be used for implementing all the computing systems that may be utilized to implement the features of the present disclosure. Computer system 401 may comprise a central processing unit ("CPU" or "processor") 402. Processor 402 may comprise at least one data processor for executing program components for executing user- or system-generated requests. The processor may include specialized processing units such as integrated system (bus) controllers, memory management control units, floating point units, graphics processing units, digital signal processing units, etc. The processor 402 may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RE antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold. 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface 407 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 14, etc.) via a storage interface 412. The storage interface may connect to memory devices including, without limitation, memory drives, removable disc drives, etc., employing connection protocols such as serial advanced technology attachment (SATA integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 415 may store a collection of program or database components, including, without limitation, an operating system 16, user interface application 17, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 many facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML) table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As described above, the modules 206, amongst other things, include routines, programs, objects, components, and data structures, which perform particular tasks or implement particular abstract data types. The modules 206 may also be implemented as, signal processor(s), state machine(s), logic circuitries, and/or any other device or component that manipulate signals based on operational instructions. Further, the modules 206 can be implemented by one or more hardware components, by computer-readable instructions executed by a processing unit, or by a combination thereof.

The illustrated steps are set out to explain the exemplary embodiments shown, and it should be anticipated that ongoing, technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of generating a test suite comprising a plurality of test cases, said method comprising:
   receiving, by a processor of a test suite generating system, a plurality of first requirements, wherein each of the plurality of first requirements comprises functional requirements, service requirements, and performance requirements associated with a software application;
   identifying, by the processor, one or more interdependencies among the functional requirements, the service requirements, and the performance requirements;
   generating, by the processor, an interdependency matrix based on one or more interdependencies;
   determining, by the processor, one or more execution sequences of the plurality of first requirements based on the interdependency matrix, wherein the one or more execution sequences of the plurality of first requirements improve response times and avoid product regression; and
   generating, by the processor, the test suite comprising the plurality of test cases based on the one or more execution sequences of the plurality of first requirements.

2. The method as claimed in claim 1, wherein generating the test suite upon determining the one or more execution sequences comprises the steps of:
   determining a plurality of intermediate test cases based on the one or more execution sequences of the plurality of first requirements;
   mapping, the plurality of intermediate test cases with a plurality of predefined test cases obtained from a test case repository coupled with the test suite generating system, wherein the plurality of predefined test cases are associated with execution outputs;
   obtaining a plurality of mapped test cases for optimized execution output based on the mapping; and
   generating the test suite comprising plurality of mapped test cases.

3. The method as claimed in claim 1, wherein determining the one or more execution sequences of the plurality of the first requirements comprises the steps of:
   identifying one or more second requirements amongst the plurality of first requirements having similar interdependencies based on the interdependency matrix;
   grouping the one or more second requirements to generate at least one group of the one or more second requirements; and
   assigning a sequence number to each of the at least one group based on an interdependency level among the one or more second requirements within the at least one group to generate the one or more execution sequences of the plurality of first requirements.

4. The method as claimed in claim 3, wherein assigning the sequence number to each of the at least one group of the one or more second requirements comprises the steps of:
   assigning a lower order sequence number to a group amongst the at least one group if the one or more second requirements in the group are not dependent on execution of one or more second requirements present in the other groups; and
   assigning a higher order sequence number to a group amongst the at least one group if the one or more second requirements in the group are dependent on execution of one or more second requirements present in the other groups.

5. The method as claimed in claim 2, further comprising updating the test case repository with the generated test suite comprising the plurality of test cases along with the execution outputs associated with execution of the generated test suite.

6. A system for generating a test suite comprising plurality of test cases said system comprising:
   a processor;
   a test case repository, coupled with the processor, for storing one or more historical test cases and the execution outputs associated with execution of the one or more historical test cases; and
   a memory disposed in communication with the processor and storing processor-executable instructions, the instructions comprising instructions to:
   receive a plurality of first requirements, wherein each of the plurality of first requirements comprises functional requirements, service requirements, and performance requirements associated with a software application;
   identify one or more interdependencies among the functional requirements, the service requirements, and the performance requirements;
   generate an interdependency matrix based on one or more interdependencies;
   determine one or more execution sequences of the plurality of first requirements based on the interdependency matrix, wherein the one or more execution sequences of the plurality of first requirements improve response times and avoid product regression; and
   generate the test suite comprising the plurality of test cases based on the one or more execution sequences of the plurality of first requirements.

7. The system as claimed in claim 6, wherein the processor is configured to generate the test suite upon determining the one or more execution sequences by performing the steps of:
   determining a plurality of intermediate test cases based on the one or more execution sequences of the plurality of first requirements;
   mapping the plurality of intermediate test cases with a plurality of predefined test cases obtained from a test case repository coupled with the test suite generating system, wherein the plurality of predefined test cases are associated with execution outputs;
   obtaining a plurality of mapped test cases for optimized output based on the mapping; and generating the test suite comprising the plurality of mapper test cases.

8. The system as claimed in claim 6, wherein the processor is configured to determine one or more execution sequences of the plurality of the first requirements by performing the steps of:
identifying one or more second requirements amongst the plurality of first requirements having similar interdependencies based on the interdependency matrix;
grouping the one or more second requirements to generate at least one group of the one or more second requirements; and
assigning a sequence number to each of the at least one group based on an interdependency level among the at least one group to generate the one or more execution sequences of the plurality of first requirements.

9. The system as claimed in claim 8, wherein the processor is configured to assign a sequence number to each of the at least one group of the one or more second requirements by performing the steps of:
assigning a lower order sequence number to a group amongst the at least one group if the one or more second requirements in the group are not dependent on execution of one or more second requirements present in the other groups; and
assigning a higher order sequence number to a group amongst the at least one group if the one or more second requirements in the group are dependent on execution of one or more second requirements present in the other groups.

10. The system as claimed in claim 6, wherein the processor is further configured to update the test case repository with the generated test suite comprising the plurality of test cases along with the execution outputs results associated with execution of the generated test suite.

11. A non-transitory computer readable medium including instructions stored thereon that when processed by at least one processor cause a system to perform acts of:
receiving a plurality of first requirements, wherein each of the plurality of first requirements comprises functional requirements, service requirements, and performance requirements associated with a software application;
identifying one or more interdependencies among the functional requirements, the service requirements, and the performance requirements;
generating, an interdependency matrix based on one or more interdependencies;
determining one or more execution sequences of the plurality of first requirements based on the interdependency matrix, wherein the one or more execution sequences of the plurality of first requirements improve response times and avoid product regression; and
generating the test suite comprising the plurality of test cases based on the one or more execution sequences of the plurality of first requirements.

12. The medium as claimed in claim 11, wherein the instructions, on execution, further cause the at least one processor to generate the test suite upon determining the one or more execution sequences by performing the steps of:
determining a plurality of intermediate test cases based on the one or more execution sequences of the plurality of first requirements;
mapping the plurality of intermediate test cases with a plurality of predefined test cases obtained from a test case repository coupled with the test suite generating system, wherein the plurality of predefined test cases are associated with execution outputs;
obtaining a plurality of mapped test cases for optimized output based on the mapping; and
generating the test suite comprising the plurality of mapped test cases.

13. The medium as claimed in claim 11, wherein the instructions, on execution, further cause the at least one processor to determine one or more execution sequences of the plurality of the requirements by performing the steps of:
identifying one or more second requirements amongst the plurality of first requirements having similar interdependencies based on the interdependency matrix;
grouping the one or more second requirements to generate at least one group of the one or more second requirements; and
assigning a sequence number to each of the at least one group based on an interdependency level among the at least one group to generate the one or more execution sequences of the plurality of first requirements.

14. The medium as claimed in claim 13, wherein the instructions, on execution, further the at least one processor to assign a sequence number to each of the at least one group of the one or more second requirements by performing the steps of:
assigning a lower order sequence number to a group amongst the at least one group if the one or more second requirements in the group are not dependent on execution of one or more second requirements present in the other groups; and
assigning a higher order sequence number to a group amongst the at least one group if the one or more second requirements in the group are dependent on execution of one or more second requirements present in the other groups.

15. The medium as claimed in claim 12, wherein instructions, on execution, further cause the at least one processor to update the test case repository with the generated test suite comprising the plurality of test cases along with the execution outputs associated with execution of the generated test suite.

* * * * *

UNITED STATES PATENT AND TRADEMARK OFFICE
CERTIFICATE OF CORRECTION

PATENT NO. : 9,886,370 B2
APPLICATION NO. : 14/945852
DATED : February 6, 2018
INVENTOR(S) : Sathya Keerthi Mohan Doss Page 1 of 1

It is certified that error appears in the above-identified patent and that said Letters Patent is hereby corrected as shown below:

In the Claims

Claim 2, Column 13, Line 50, "mapping," should read as --mapping--.

Claim 11, Column 15, Line 46, "generating," should read as --generating--.

Claim 14, Column 16, Line 34, "further the" should read as --further cause the--.

Signed and Sealed this
Twenty-sixth Day of June, 2018

Andrei Iancu
*Director of the United States Patent and Trademark Office*